March 6, 1934.    P. B. REEVES    1,949,975
VARIABLE SPEED GRINDER
Filed Feb. 6, 1931    2 Sheets-Sheet 1
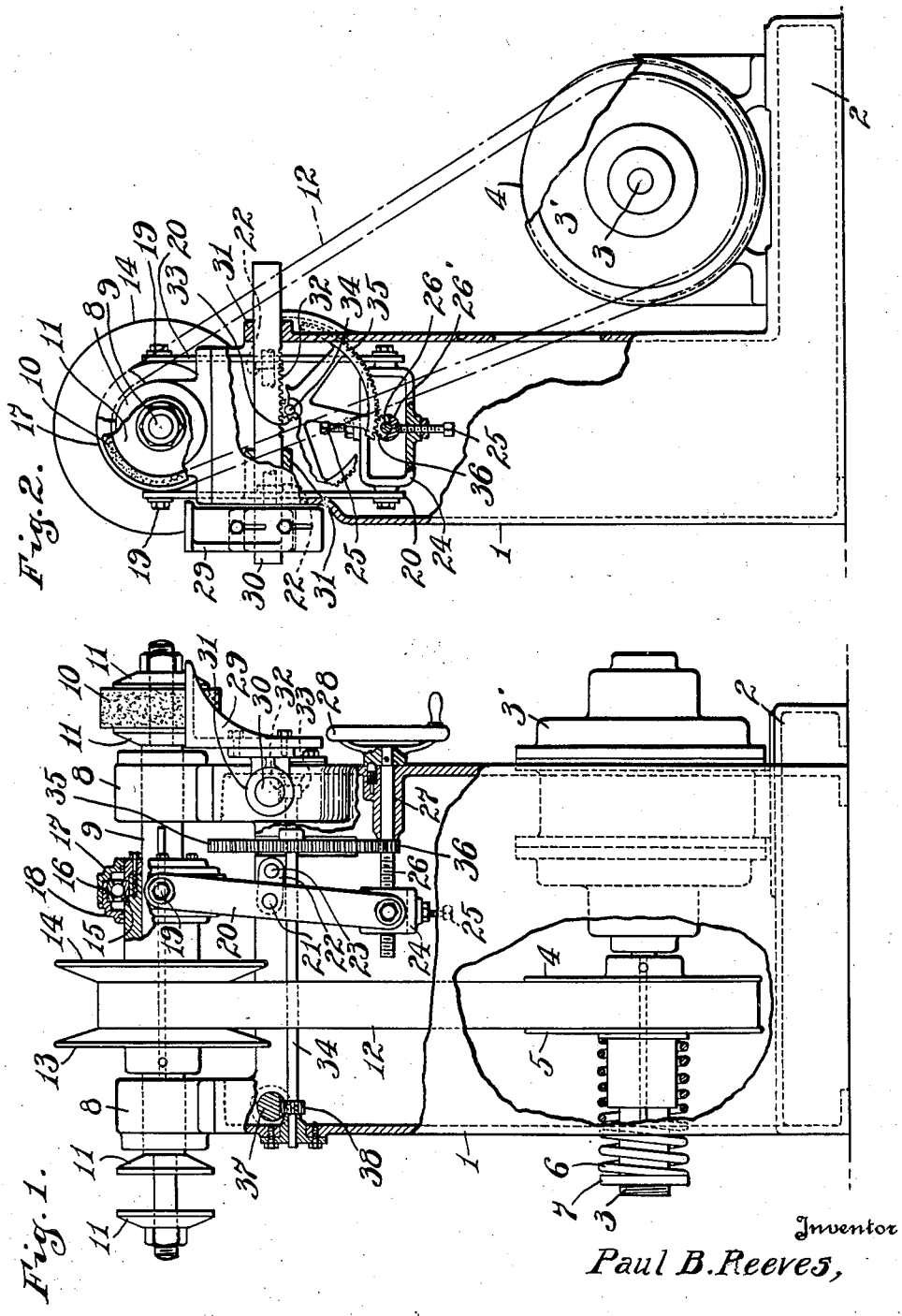
Inventor
Paul B. Reeves,
By
Hood + Hahn.
Attorneys March 6, 1934. P. B. REEVES 1,949,975
VARIABLE SPEED GRINDER
Filed Feb. 6, 1931   2 Sheets-Sheet 2

Inventor
Paul B. Reeves,

By Hood + Hahn.
Attorneys

UNITED STATES PATENT OFFICE 1,949,975

VARIABLE SPEED GRINDER

Paul B. Reeves, Columbus, Ind., assignor to Reeves Pulley Company, Columbus, Ind., a corporation of Indiana Application February 6, 1931, Serial No. 513,810

2 Claims. (Cl. 51—166)

My invention relates to improvements in speed varying units and has for one of its objects the provision of a speed varying unit by which the peripheral speed of a grinding or like wheel may be maintained constant under varying conditions of wear of the wheel.

For the purpose of disclosing my invention, I have illustrated one embodiment of the same in the accompanying drawings, in which:

Fig. 1 is a front elevation partially in section of a unit embodying my invention;

Fig. 2 is a side elevation thereof, partially in section.

Figure 3:
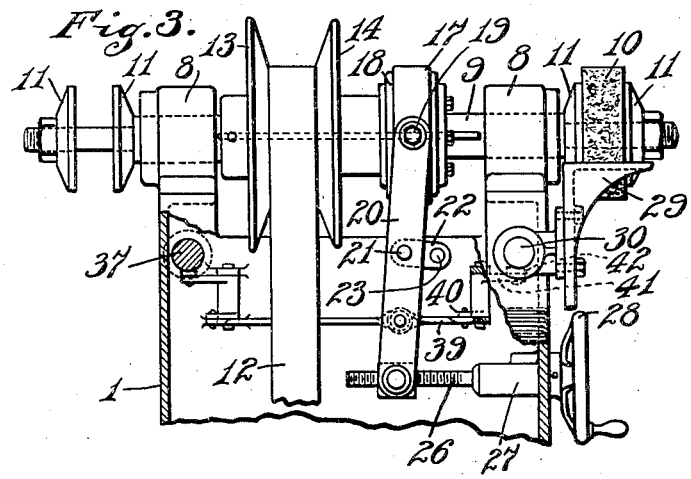
Fig. 3 is a partial side elevation of a modification of my invention.

In the embodiment of the invention illustrated in Figs. 1 and 2 I provide a hollow standard 1 having a lateral extension or base 2. An electric motor or other motor drive 3' is mounted on the base 2 and to the shaft 3 of this motor and adjacent the motor body is secured a friction cone 4 the conical friction surface of which is directed away from the motor body. Facing the cone 4 and splined upon the shaft 3 is a mating cone 5 yieldingly urged toward the cone 4 by a spring 6, the outer end of which is abutted against an adjustable collar 7 threaded upon the outer end of the shaft 3.

A pair of bearings 8—8 rising above the standard 1 have journalled therein a driven shaft 9 parallel with the shaft 3 and having secured on one end thereof a grinding wheel 10. This wheel is secured upon the shaft by the usual clamping nuts 11—11. Secured to the shaft 9, between the standards 8—8, in the vertical plane to which cone 5 may be urged by a belt 12, against the action of the spring 6, is a conical friction cone 13 and splined upon the shaft 9, in opposition to the cone 13, is a similar cone 14 to the hub of which is secured the inner race 15 of a ball cage, the outer race 16 of which is secured between the two collar members 17 and 18. This structure provides a shifting collar provided with a pair of diametrically opposite radial pins 19 connected to the ends of a yoke 20. This yoke is pivoted as at 21 to links 22 in turn pivoted as at 23 to the standard 1 and the lower end of the yoke has pivoted between its arms a block 24 having extending therethrough oppositely disposed screws 25, the ends of which take into a nut 26' on a threaded shaft 26, journalled at 27 in one side of the standard 1. This shaft has an operating wheel 28 on its outer end so that by the rotation of the threaded shaft 26 the cone pulley 14 may be shifted towards or away from the pulley 13.

A work rest 29 is supported adjacent the periphery of the grinding wheel 10. This work support or rest is mounted upon the end of a slide 30 mounted in bearings 31 in the sides of the standard 1. The slide on its under face is provided with a rack 32 adapted to engage a pinion 33 mounted on a shaft 34 likewise journalled in the sides of the standard 1. This shaft has secured thereto a gear wheel 35 meshing with a pinion 36 on the threaded screw 26 and the relation is such that the movement of the rest 29 toward the grinding wheel 10 will, at the same time, shift the cone pulley 14 away from its corresponding cone pulley 13, thus increasing the speed of the shaft 9 and thereby increasing the speed of the grinding wheel 10. The shifting of the work holder toward the grinding wheel is resultant of the decreased diameter of the wheel and therefore the increased speed of the shaft will maintain the peripheral speed of the wheel constant in spite of the fact that its diameter has been reduced. Correspondingly, when the rest 29 is shifted away from the shaft 9 the speed of the shaft is reduced.

The shaft 34 is provided with a pinion 37 meshing with a rack on a slide 38 on which may be mounted a second work rest for a grinding wheel mounted on the opposite end of the shaft 9.

Figure 4:
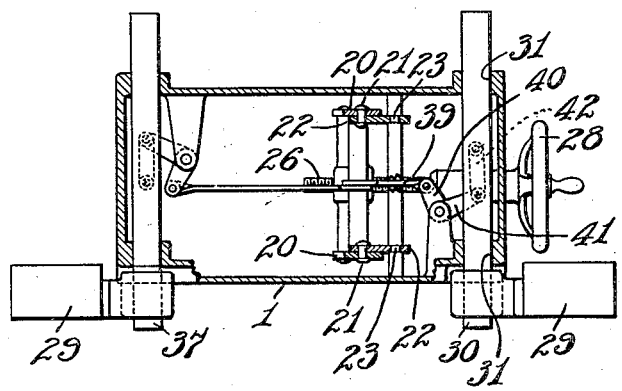
Fig. 4 is a transverse section of the structure illustrated in Fig. 3.

In Figs. 3 and 4 I have illustrated a modified structure wherein the yoke 20 is connected by a link 39 with one arm 43 of a bell crank lever. The opposite arm 41 of the lever is connected by a link 42 with the slide 30. This arrangement like that shown in Figs. 1 and 2 also provides for the synchronized movement of the pulley and work rest. A duplication of this structure may be used for the slide 37 when it is desired to mount grinding wheels on both ends of the shaft 9.

I claim as my invention:

1. In a speed varying unit, the combination with a driving motor, of a fixed cone pulley mounted on the shaft of said motor, a movable cone pulley mounted on said shaft and biased toward said fixed pulley, a driven shaft, a fixed cone pulley on said other shaft, a movable cone pulley on said shaft adjustable relatively to said fixed pulley, a belt connecting said pairs of pulleys, a grinding wheel on said driven shaft, a work support associated with said grinding wheel and adjustable relatively to the driven shaft, and means for simultaneously adjusting said adjustable pulley and said work support.

2. In a speed varying unit, the combination with a driving shaft, of a pair of relatively adjustable pulleys mounted thereon, a driven shaft, a pair of relatively adjustable pulleys mounted thereon and belt driven from the first pair of pulleys, a grinding wheel mounted on said driven shaft, a work support adjustable relatively thereto, a pivoted lever for relatively adjusting the pulleys on said driven shaft, a threaded shaft for manipulating said lever, a rack connected with said work support, a pinion operating said rack and means operated by the rotation of said threaded shaft for operating said pinion.

PAUL B. REEVES.